United States Patent
Seabra

[19]

[11] Patent Number: 5,909,902
[45] Date of Patent: *Jun. 8, 1999

[54] INSERT FOR LOCKING A TUBE IN A CONNECTION BODY

[75] Inventor: Helio Lanfranchi Seabra, Sao Paulo, Brazil

[73] Assignee: Metalurgica Detroit S.A., Diadema, Brazil

[*] Notice: This patent issued on a continued prosecution application filed under 37 CFR 1.53(d), and is subject to the twenty year patent term provisions of 35 U.S.C. 154(a)(2).

[21] Appl. No.: 08/791,904

[22] Filed: Jan. 31, 1997

Related U.S. Application Data

[63] Continuation of application No. 08/306,888, Sep. 16, 1994, abandoned.

[30] Foreign Application Priority Data

Mar. 24, 1994 [BR] Brazil ................................ 7400587 U

[51] Int. Cl.⁶ ...................................................... F16L 21/06
[52] U.S. Cl. ............................................ 285/322; 285/323
[58] Field of Search ..................................... 285/322, 323

[56] References Cited

U.S. PATENT DOCUMENTS

| | | |
|---|---|---|
| 461,311 | 10/1891 | Brown . |
| 1,083,742 | 1/1914 | Hutchinson . |
| 1,911,423 | 5/1933 | Biller . |
| 2,172,650 | 9/1939 | Couty . |
| 2,190,419 | 2/1940 | Evarts . |
| 2,543,088 | 2/1951 | Woodling . |
| 3,414,299 | 12/1968 | Roe . |
| 3,743,326 | 7/1973 | Lovrtot et al. ........................ 285/323 |
| 4,005,883 | 2/1977 | Guest . |
| 4,178,023 | 12/1979 | Guest ................................... 285/323 |
| 4,304,426 | 12/1981 | Francis ................................. 285/323 |
| 4,606,783 | 8/1986 | Guest ................................... 285/323 |
| 4,685,706 | 8/1987 | Kowal et al. . |
| 4,867,484 | 9/1989 | Guest . |
| 4,905,766 | 3/1990 | Dietz et al. . |
| 4,951,391 | 8/1990 | Seabra .............................. 29/890.14 |
| 4,998,755 | 3/1991 | Reeder . |
| 5,072,072 | 12/1991 | Bawa et al. ......................... 285/243 |
| 5,141,262 | 8/1992 | Bartholomew . |
| 5,171,045 | 12/1992 | Pasbrig . |
| 5,230,539 | 7/1993 | Olson . |
| 5,564,757 | 10/1996 | Seabra ................................. 285/322 |

FOREIGN PATENT DOCUMENTS

| | | | |
|---|---|---|---|
| 4002057 | 2/1991 | Germany ............................. 285/323 |

*Primary Examiner*—Eric K. Nicholson
*Attorney, Agent, or Firm*—Jacobson, Price, Holman & Stern, PLLC

[57] ABSTRACT

A tubular glove or insert having a front ring relief at one end and at an opposite end, an external ring relief. In an internal edge of the external ring relief are located two internal ring rows of teeth. A polyhedric tool is used to form a plurality of V-shaped cuttings or notches at equal distances in the internal surfaces of the external ring relief. The cuttings are then submitted to a further cutting or milling operation to form longitudinal slots centered at a vertex of the V-shaped notches at the back extremity of the V-shaped notches near the front ring relief so that the glove can be inserted into a connection body. This process allows the manufacturing of connection gloves (inserts) with a reduction in length and consequent reduction of material used and equipment used, as well as specialized manpower, while strengthening the grasping surface of the glove on a tube.

1 Claim, 2 Drawing Sheets

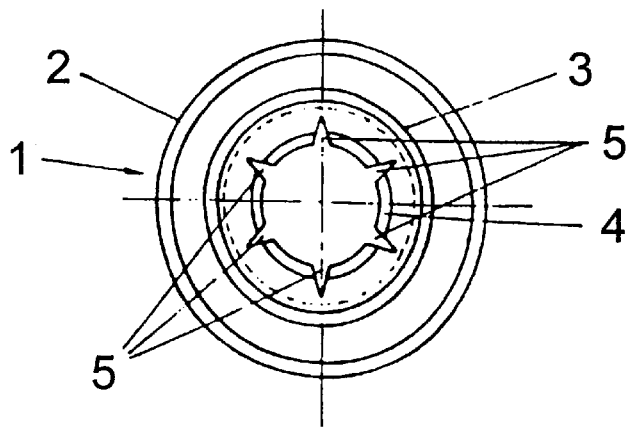
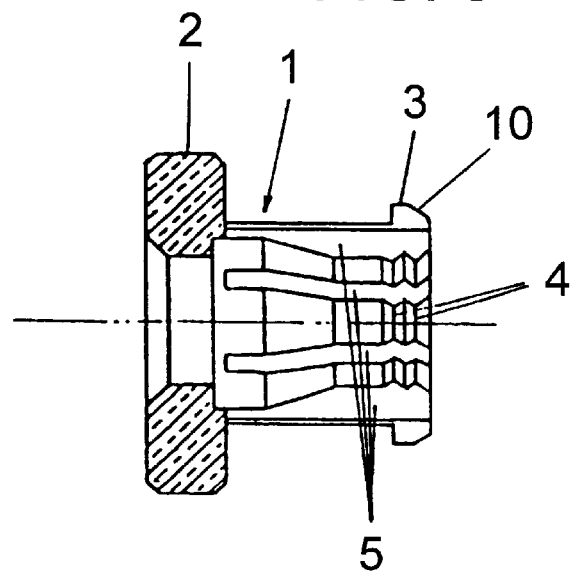
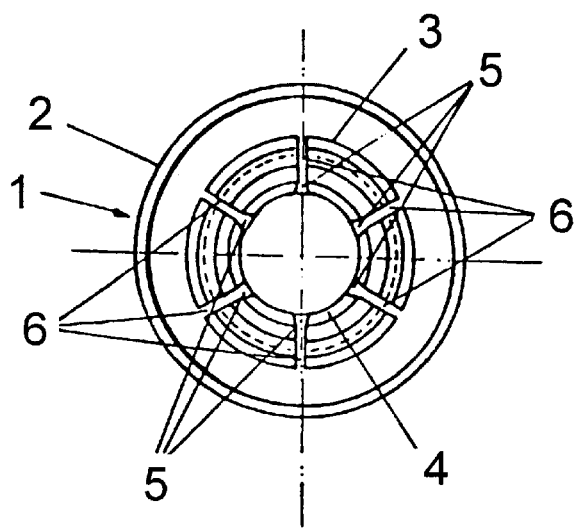

INSERT FOR LOCKING A TUBE IN A CONNECTION BODY

This application is a file wrapper continuation of application Ser. No. 08/306,888, filed Sep. 16, 1994 now abandoned.

FIELD OF THE INVENTION

The present invention relates to an improvement in the manufacturing of connection gloves or inserts for tubes, whose development allows the manufacture of connection gloves to allow a reduction of its length, with a subsequent decrease in material used and equipment used, as well as specialized manpower, besides realizing an increase in the amount of gripping of the surface of a tube.

BACKGROUND OF THE INVENTION

The conventional method of manufacturing a glove or insert with internal claws at an internal circumferential edge consists of the manufacture of a grasping edge and then processing by the milling of slots or longitudinal cuts in the glove, up to a certain height, to form clasps. This method leaves barbs which may damage the surface of the inserted tube and reduce its resistance to internal pressures.

By this, it is understood that the formed claws present sharp corners that may harm the efficiency and consequently the security of the equipment where the tube was placed, requiring untrustworthy additional expensive operations.

In addition, the gloves (inserts), produced thus far, are of a substantial length and require more material and equipment than desired, as well as specialized manpower

SUMMARY OF THE INVENTION

By the present invention, an improvement is introduced to the manufacturing process of gloves for connection tubes constituted by a production of a plurality of V-shaped ring reliefs in a grasping edge of a tubular body at an opposite extremity of a traction ring relief. The internal surface of the tubular body is initially cut by a drilling operation of a plurality of V-shaped channels or notches, distributed at equal distances about the periphery of one end of the tubular body. The tubular body then receives cuts or slots in the vertex of the notches which extend up to the traction ring relief in order to allow its internal edges to be abated by bevelling and consequently rendering the formation of barbs impossible.

BRIEF DESCRIPTION OF THE DRAWINGS

In order to better understand the objectives of this invention, reference shall be made to the attached drawings where:

FIG. 4 shows, in a rear view, the application of V-shaped notched cuttings in the above mentioned intermediate stage.

FIG. 5 shows, in longitudinal cross section, the glove after the application of longitudinal cuts near the ring relief.

FIG. 6 shows, in a rear view, the application of longitudinal cuts near the ring relief.

DETAILED DESCRIPTION OF THE PREFERRED EMBODIMENTS

Figure 1:
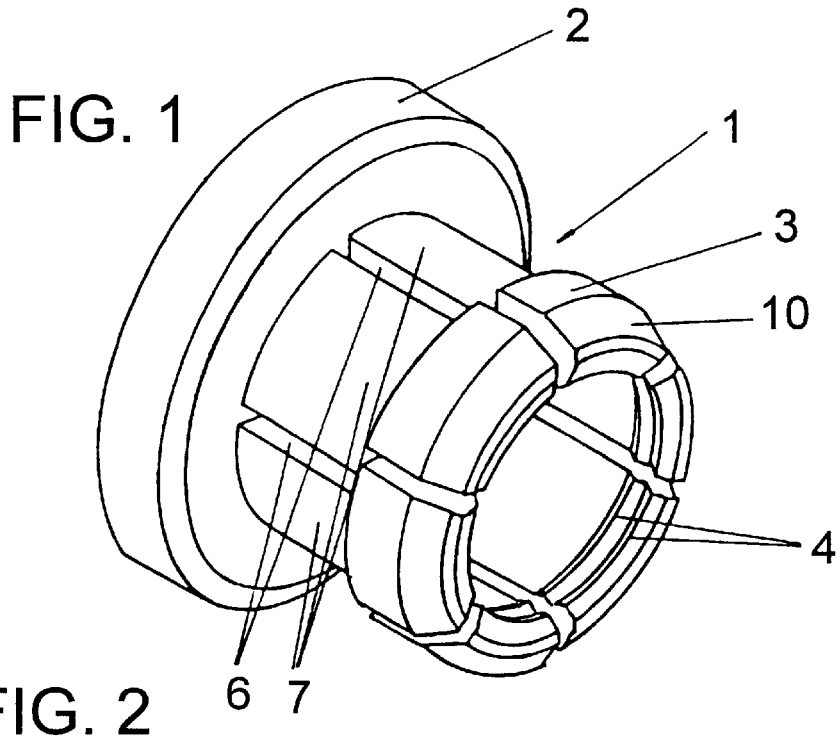
FIG. 1 shows, in an upper front view, the glove (insert), where it is shown that the longitudinal cuts reach the traction ring relief.
Figure 2:
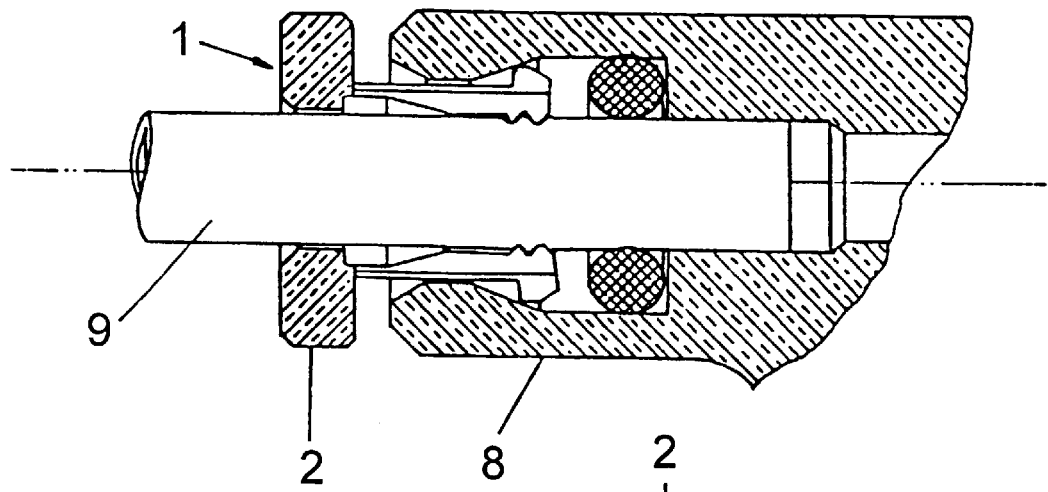
FIG. 2 depicts, in longitudinal cross section, a connection including the glove, which locks a tube in a connection body by two locking rows of teeth.
Figure 3:
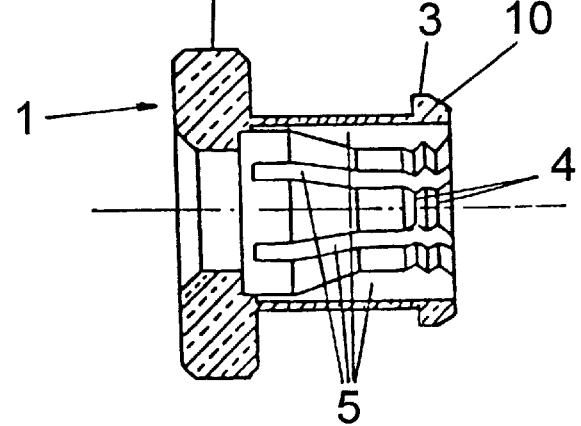
FIG. 3 shows, in longitudinal cross section, the glove in an intermediate state of manufacture and the application of V-shaped notched cuttings.

A tubular glove (insert) body 1, having a front ring relief 2 at one end and at an opposite end, an internal ring relief 3 with bevelled edge 10. At an internal edge of the internal ring relief 3, two internal ring rows of teeth 4 are formed to constitute a grasping edge. The teeth 4 have a rounded, engaging edge at their apex, as shown in FIG. 2, to engage the tube 9. A polyhedric tool is used to form a plurality of V-shaped cuttings or notches 5, distributed at equal distances, at the edge of the internal surface of the glove, near the ring relief 2.

The V-shaped cuttings or notches 5 are then submitted to a further cutting or milling operation to form longitudinal slots 6 having parallel sidewalls, these cutting or milling processes to form longitudinal slots being mechanically centered in the vertex of the V-shaped cuttings or notches 5, at the back extremity of the V-shaped cuttings or notches near the ring relief 2, so as to eliminate an excessive length of the glove and to shorten the glove, thus to form flexible stems 7, the stems 7 being ready to be inserted into a connection body 8 for the axial locking of a tube 9.

I claim:

1. An insert for locking a tube in a connection body, said insert comprising:

a tubular body having two ends, an internal ring relief located at one of said two ends, a front ring relief located at the other of said two ends, a plurality of slots equally spaced about and extending longitudinally along said tubular body from said internal ring relief of said one end of said tubular body all the way up to the front ring relief at the other end of said tubular body to form a plurality of stems anchored from the front ring relief and being free at said internal ring relief, each of said slots defining two tapering surfaces on said stems transitioning from an interior surface of said tubular body to parallel extending sidewalls leading to an exterior surface of said tubular body, the exterior surface of said tubular body located between said internal ring relief and said front ring relief being continuously cylindrically shaped except for the plurality of slots extending between the internal ring relief and the front ring relief, said stems defining an axially extending passageway including a radially inwardly tapering internal surface portion of said tubular body initiating at said front ring relief with a first portion extending parallel to a longitudinal axis of said tubular body, leading to a radially inwardly tapering second portion and progressively extending towards said internal ring relief and terminating in a third portion extending parallel to said longitudinal axis so that said stems are thinner in a radial direction adjacent to said front ring relief at said first portion than at said internal ring relief as said stems extend progressively towards said internal ring relief located at said third portion, an internal surface of said tubular body at said first portion being spaced radially outwardly with respect to a surface of said axial passageway at said front ring relief so that the stems anchored at said front ring relief are flexibily moved about the anchoring of said stems at said front ring relief during passage therethrough of a tube for engagement by the surface of the axial passageway at the front ring relief and the third portion of the tubular body.

only two rows of teeth located on an internal surface of said tubular body at said third portion being positioned at an opposite end of said third portion from said second portion and adjacent to said internal ring relief of said tubular body and adjacent to each other, respective opposed sidewalls of substantially equal length of said two rows of teeth intersecting with each other to form a V-shaped recess therebetween, and a bevelled edge located on an external surface of said stems at said internal ring relief, said bevelled edge being flat, extending transverse to the longitudinal axis of the tubular body, and extending radially outwardly in a direction from said internal ring relief towards said front ring relief.

* * * * *